(12) United States Patent
Komarowski et al.

(10) Patent No.: US 6,438,906 B1
(45) Date of Patent: Aug. 27, 2002

(54) SAFE ROOM

(75) Inventors: Nadia Komarowski, Marco Island, FL (US); Joey Deming, Bolivar, TN (US)

(73) Assignee: Paul Janssens-Lens, Marco Island, FL (US)

( * ) Notice: Subject to any disclaimer, the term of this patent is extended or adjusted under 35 U.S.C. 154(b) by 0 days.

(21) Appl. No.: 09/618,632

(22) Filed: Jul. 18, 2000

(51) Int. Cl.⁷ .............................................. B60R 27/00
(52) U.S. Cl. .......................... 52/169.1; 109/79; 89/36; 52/309.9; 52/169.6; 264/46.2; 428/314.4
(58) Field of Search ............... 52/169.6, 79.1, 52/309.9, 309.11; 109/78, 79, 80, 82, 83, 84, 85

(56) References Cited

U.S. PATENT DOCUMENTS

| | | | | |
|---|---|---|---|---|
| 4,404,889 A | * | 9/1983 | Miguel ........................... | 89/36 |
| 4,426,935 A | * | 1/1984 | Nickoden, Jr. ................ | 109/79 |
| 4,698,278 A | * | 10/1987 | Prang ....................... | 428/314.4 |
| 5,662,132 A | | 9/1997 | Larsen | |
| 5,664,386 A | | 9/1997 | Palmersten | |
| 5,827,458 A | * | 10/1998 | Meadows ................... | 264/46.2 |
| 5,921,043 A | * | 7/1999 | McDonald ................. | 52/309.9 |
| 5,930,961 A | | 8/1999 | Beaudet | |
| 5,992,110 A | | 11/1999 | Clear | |
| 6,085,475 A | * | 7/2000 | Parks et al. ................ | 52/169.6 |

OTHER PUBLICATIONS

80/20 The Industrial Erector Set, Catalog No. 0498, 1998, 113.*

News, "Tornado Safe Rooms Take Center Stage at Western States Public Safety Awareness Day," Path, Aug. 5, 1999.

Federal Emergency Management Agency Mitigation Directorate, "National Performance Criteria for Tornado Shelters," Texas Tech University, May 28, 1999, pp. 1–8.

FEMA, "Mitigation—Reducing Risk Through Mitigation; Tornado Safe Room Photographs", Jul. 28; Oct. 12, 1999.

FEMA, "Taking Shelter From the Storm: Building a SafeRoom Inside Your House", Texas Tech University, Oct. 1998, pp. 1–28.

* cited by examiner

*Primary Examiner*—Carl D. Friedman
*Assistant Examiner*—Steve Varner
(74) *Attorney, Agent, or Firm*—Stephen C. Glazier

(57) ABSTRACT

A safe room for protecting an occupant against tornado and other extremely high winds, where at least one wall member and roof member of the safe room are constructed from at least one metallic-skinned foam panels having an impact-absorbing sheathing attached to at least one side of the metallic-skinned foamed panel as a cladding layer. The safe room also includes at least one securable door, and is further fixedly anchored to a foundation. The safe room using this construction is lightweight yet strong enough to withstand killer tornado and hurricane wind loads and airborne debris impact loads. The safe room can therefore be pre-assembled and shipped to the installation site with only the need to be secured to a foundation. Or, the safe room can be easily assembled at the installation site from a kit. In either case, installation of the safe room is easy, inexpensive, and, apart from the foundation and anchorage thereto, requires no structural additions.

12 Claims, 8 Drawing Sheets

SAFE ROOM

FIELD OF INVENTION

This invention relates to safe rooms for protecting an occupant against tornadoes, hurricanes, burglary, bombs, and other hazards.

BACKGROUND OF THE INVENTION

Tornadoes and hurricanes produce extremely high winds that can totally destroy a home or other structure. Unless one is extremely lucky, an occupant of such a home or structure will likely be killed, either from being struck by flying or collapsing debris or by being carried away by the high force winds.

There are essentially two types of structures designed to protect individuals during such storms. The first type of structure is a completely reinforced dwelling with its walls and foundation initially designed to withstand the extreme wind forces generated from killer tornadoes and hurricanes. These structures are expensive and do not provide a solution for structures, and particularly homes, that were constructed using standard building codes, i.e., that were not initially designed to withstand tornado-force winds. The second type of structure is a reinforced emergency shelter, which is also referred to as a safe room. Safe rooms are either built inside an existing dwelling in the basement or on the ground floor, or they are placed outside the dwelling in close proximity. Because of their relative cost and adaptability to existing homes, safe rooms are, to most homeowners, the only viable solution for protection against killer tornadoes and hurricanes.

The structural performance of safe room shelters is specified by the Federal Emergency Management Agency (FEMA). These criteria state that the walls, ceiling, structural attachments and foundation system must withstand forces generated from 250 mile per hour (mph) wind at 3-second peak gusts. The shelter walls, ceiling and floor must withstand these design pressures such that no element shall separate from another, and the entire shelter structure must resist failure from overturning, shear (sliding), and uplift. The walls and ceiling must also withstand, without perforation, loads from a windborne missile impact. The impact load is established to be that of a 15 pound, 2×4 wood board missile traveling at 100 mph, which is the assumed speed of the board in 250 mph winds.

A safe room that satisfies the above criteria and promoted by FEMA is constructed of concrete walls reinforced with steel rebar. The concrete forms are foam sections that are light weight and can be assembled by one or two people. The concrete-filled, foam-formed walls may be built into new housing or added inside or outside of existing structures at a relatively low cost. Although effective, the above shelter requires construction at the installation site and requires multiple and expensive construction steps and materials: a foam form, steel rebar, and the pouring of concrete.

Therefore, it is the object of the present invention to provide an emergency shelter or safe room that can be easily assembled at the installation site, or can be shipped to the installation site already assembled with only the need to be secured to the foundation. Such a safe room must therefore be lightweight for ease of shipment and assembly, but must also be strong enough to withstand the design criteria described above.

SUMMARY OF THE INVENTION

The aforementioned is accomplished in accordance with the principles of the present invention by providing a safe room comprised of at least one wall and at least one roof, both of which comprise at least one metallic-skinned foam panel with an impact-absorbing sheathing attached to at least one side of the metallic-skinned foamed panels as a cladding layer. The safe room also comprises at least one securable door, and the safe room is fixedly anchored to a foundation.

Other objects, features, and characteristics of the present invention, as well as the methods of operation of the invention and the function and interrelation of the elements of structure, will become more apparent upon consideration of the following description and the appended claims with reference to the accompanying drawings, all of which form a part of this disclosure, wherein like reference numerals designate corresponding parts in the various figures.

BRIEF DESCRIPTION OF THE INVENTION

DETAILED DESCRIPTION OF THE INVENTION

Figure 1:
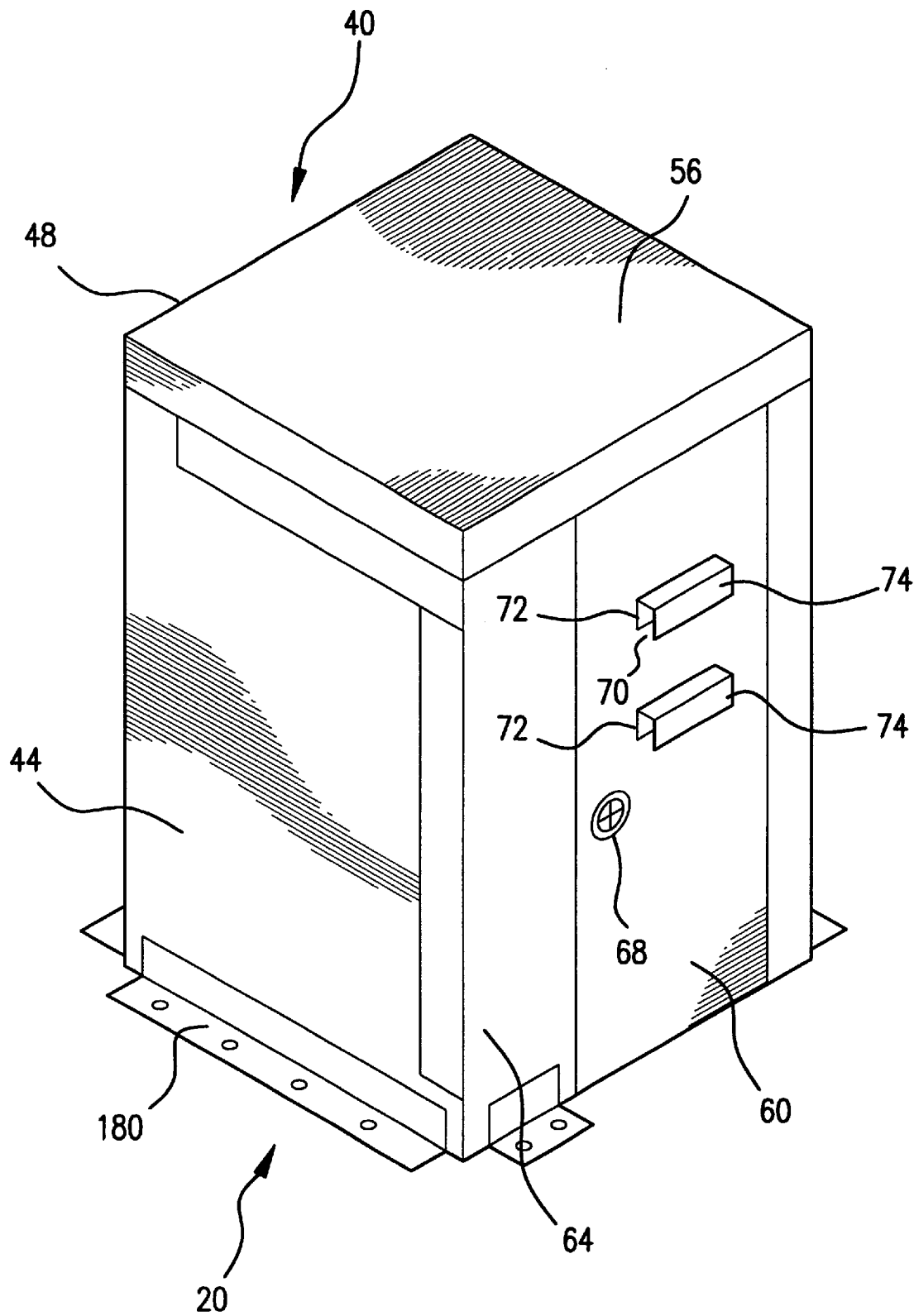
FIG. 1 is a perspective view of a first embodiment of the safe room.

Throughout the following detailed description, like reference numerals are used to refer to the same element of the invention shown in multiple figures thereof. Referring now to the drawings and in particular to FIG. 1, there is shown a safe room 40 constructed according to the present invention. In the embodiment shown in FIG. 1, the safe room 40 is generally a structurally secure, enclosed room comprising four walls, a roof, and a door, all of which are assembled as a unit and anchored to a foundation. Specifically, the safe room 40 includes wall members 44, 48, 52, 64, a roof member 56, and door member 60. The safe room 40 is anchored to the foundation 20.

A significant aspect of the invention is the capacity of the above described safe room 40 to either be assembled at the installation site from a kit, or it can also be shipped to the installation site pre-assembled with only the need to be anchored to the foundation 20. In either case, installation of the safe room 40 is easy, inexpensive, and, apart from the foundation and anchorage thereto, requires no structural additions. This is made possible due to the specially fabricated wall members, which will now be described.

Figure 2:
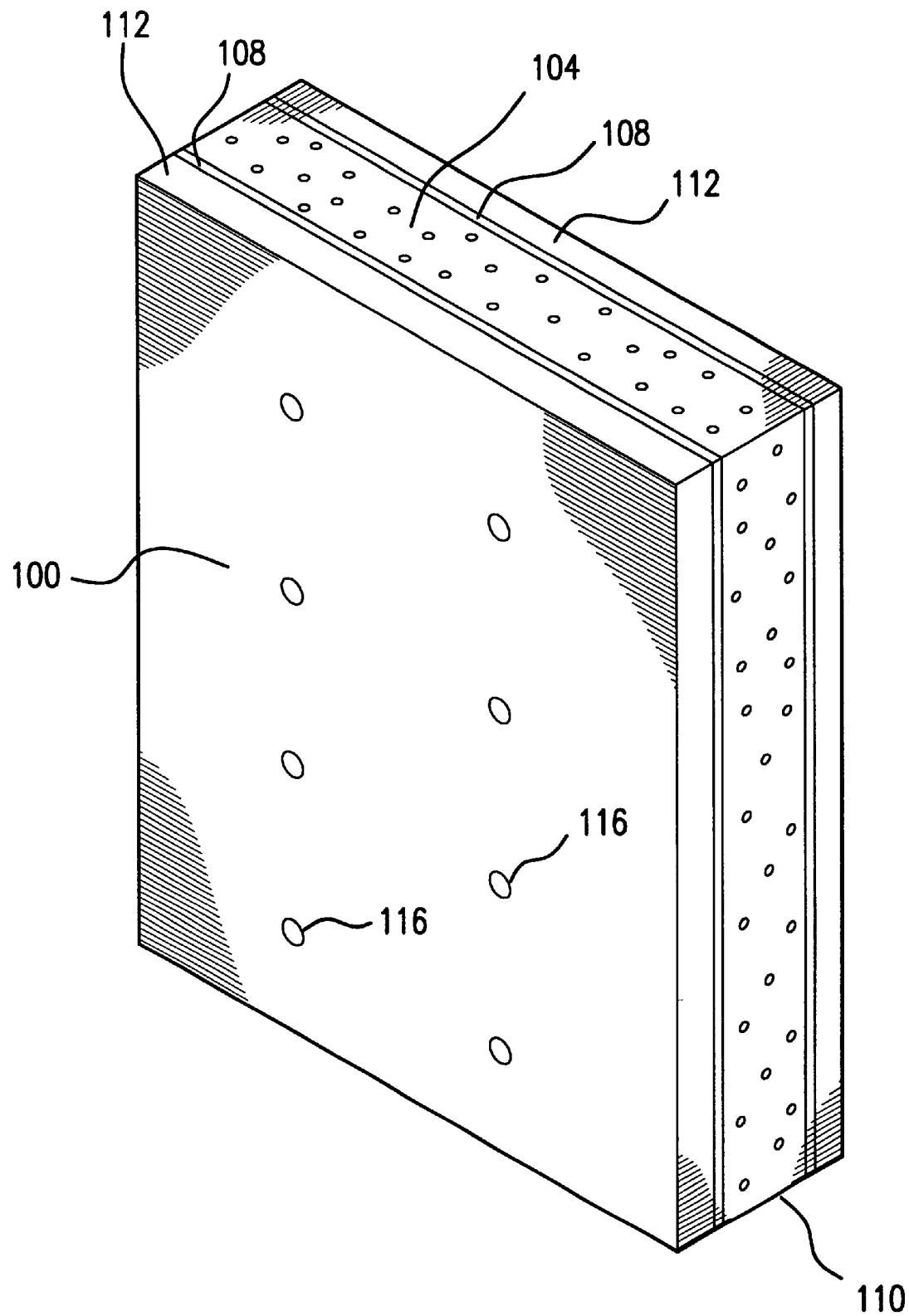
FIG. 2 is a perspective view of a wall panel used to make a wall member.

Each wall member 44, 48, 52, and 64, and roof member 56 comprises at least one wall panel 100, shown in FIG. 2. The wall panel 100 comprises a foam panel 104, both sides of which are covered by a metallic-skin 108 to give a metallic-skinned foam panel 110. At last one side of the metallic-skinned foam panel 110 has an impact-absorbing sheathing or cladding 112 attached to the metallic-skin 108. As depicted in FIG. 2, both sides of wall panel 100 may have the impact-absorbing sheathing 112 attached, but the sheathing 112 is only required on one side. The impact-absorbing sheathing 112 is attached to the panel 110 by a plurality of screws 116, or other fastening mechanism, such as rivets, metal cement, or epoxy. The impact-absorbing sheathing 112 is preferably made of a metal-alloy, but could also be made from other suitable impact-absorbing materials, such as fiberglass composite. A method of manufacturing the wall panel 100 with metallic-skin 108 is describe in U.S. Pat. No. 5,827,458, assigned to the present assignee and which is incorporated herein by reference.

Figure 3:
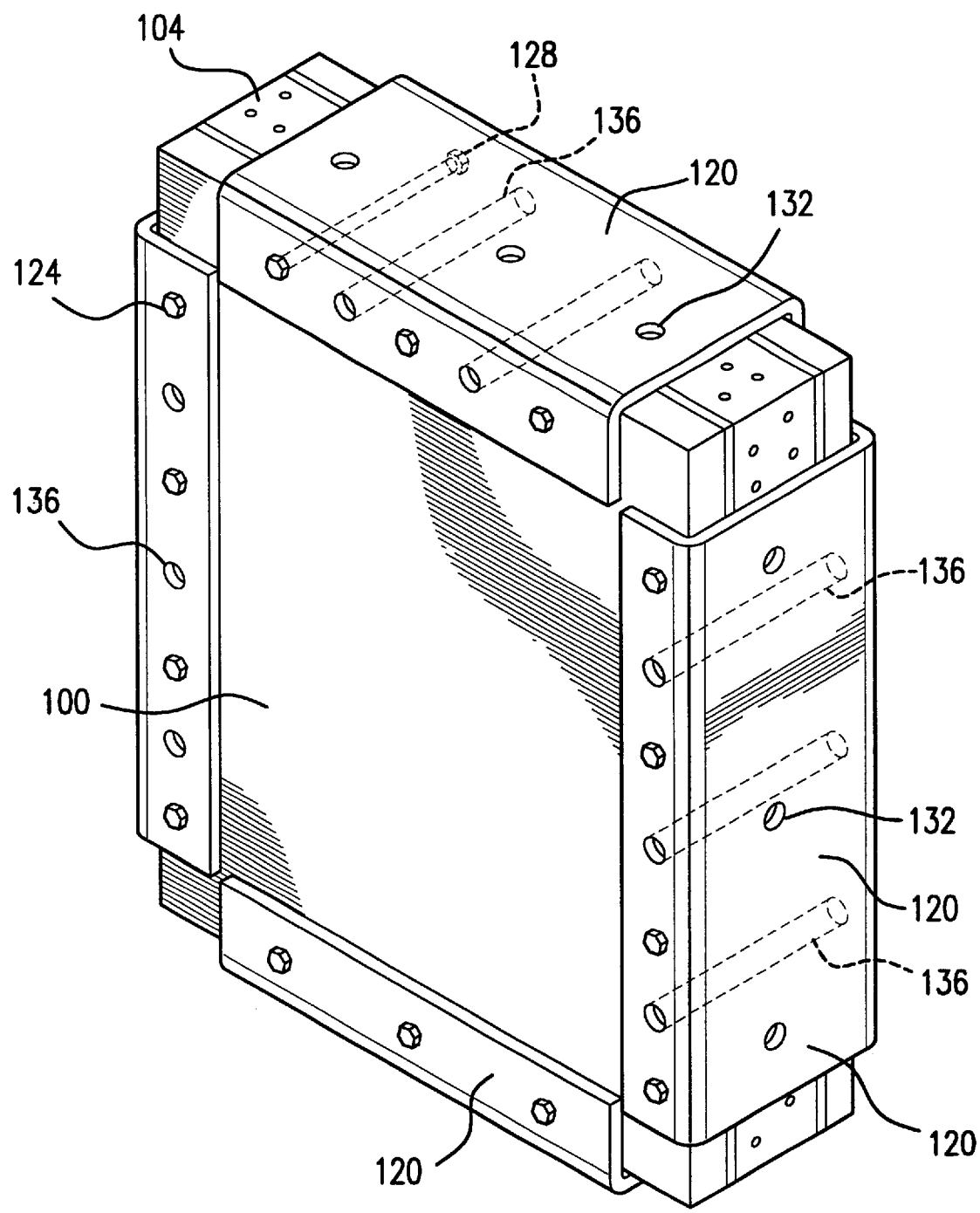
FIG. 3 is a perspective of a wall member that is used to form a wall of the safe room.

Each wall panel 100 is framed with heavy-gauge steel U-shaped channels 120, as shown in FIG. 3, which are used to connect adjacent wall members to form the safe room 40. Each edge of wall panel 100 is nested within the channel of the U-shaped channel 120. These U-shaped channels 120 are fixedly attached to the wallpanel 100 using a plurality of fasteners, such as screws or bolts 124 and fastening nuts 128. The bolts 124 reside in corresponding through holes formed near the peripheral edge of wall panel 100. Thus, the bolts 124 engage the impact-absorbing cladding 112, the metallic-skinned foam panel 110, and the U-shaped channels 120. The U-shaped channels may be attached to each other by other suitable mechanisms, such as welding. The wall panel 100 with the attached U-shaped channel 120 forms each of the wall members 44, 48, 52, 64, and roof members 56, of FIG. 1.

Figure 4:
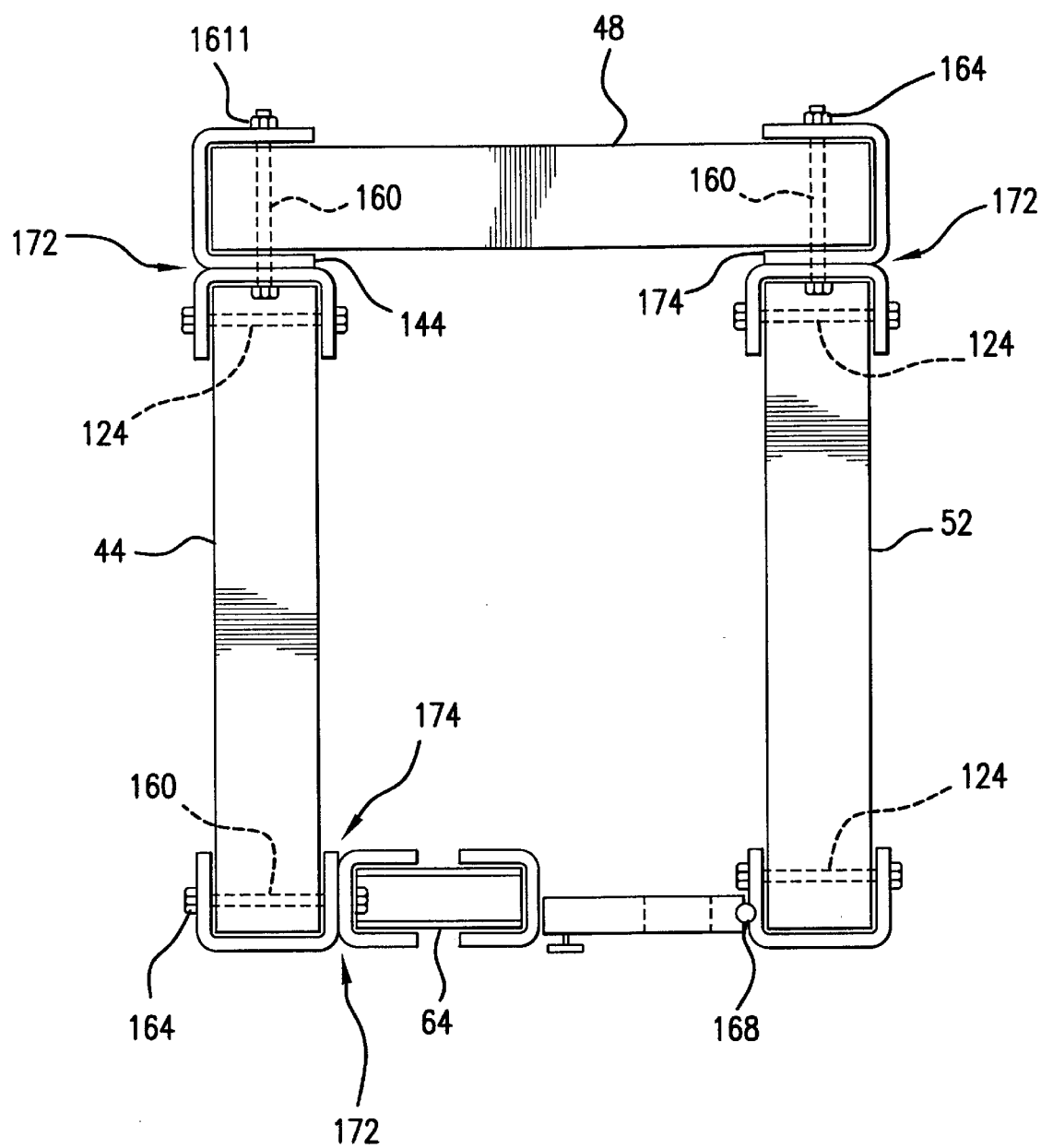
FIG. 4 is top view of the safe room shown in FIG. 1, with the roof member not shown.

The U-shaped channels 120 may contain a plurality of holes 132 formed in the flat portion of the channel, as shown in FIG. 3. Prior to bolting the U-shaped channels 120 to the wall panel 100, fastener members, such as screws or bolts 160, shown in FIG. 4 (top view of safe room 40 with roof member 56 removed), are inserted into the holes with the nut side facing outward. These bolts 160, protruding from U-shaped channels 120 on wall members 44 and 52, engage corresponding through holes 136 (shown in FIG. 3), which pass through the U-shaped channel and wall panel 100, at each end of the adjacent wall member 48. The bolts 160 are then fastened with nuts 164. Similarly, wall member 64 is fixedly connected to wall member 44. Likewise, roof member 56 and its associated U-shaped channels is bolted to the top edge of each wall member 44, 48, 52, and 64. The holes 132 may also be threaded to receive a bolt thread, in which case the bolts 160 need not be inserted into the holes 132 prior to the attachment of the U-shaped channels to the wall panel 100. In this manner, the wall members 44, 48, 52, and 64 are fixedly connected to form, along with door member 60, the four walls of the safe room 40.

Rather than using bolts 160 as the connection mechanism, the U-shaped channels 120 of adjacent wall members may also be welded together at joints 172 and 174, so long as the heat generated from the welding process does not significantly degrade the foam 104. Similarly, roof member 56 may also be welded to the top edge of each wall member 44, 48, 52, and 64. A combination of welding and bolting may also be used.

While in the preferred embodiment the U-shaped channel is made from heavy gauge steel, any other equally durable material that is strong enough to resist failure against windloads of over 250 mph can be used, such as reinforced fiberglass channels. If reinforced fiberglass channels are used rather than steel, the nut and bolt system used to connect the wall members described above would equally apply; however, welding would no longer be an option.

An outward swinging door 60 is pivotally connected to wall member 52 with a door hinge 168, which is fixedly attached to the U-shaped channel 120 on wall member 52. The door is constructed from a heavy gauge steel sheathing fixedly mounted to a heavy gauge steel tubing frame (not shown). The turning wheel handle 68 is connected to a deadbolt locking mechanism (not shown) that, when rotated, engages an inside portion of wall member 64 to prevent door 60 from swinging outward. It is noted that although shown in the preferred embodiment, wall member 64 does not need to be included in the construction of safe room 40. If not included, door member: 60 becomes the entire wall and the deadbolt locking mechanism connected to the turning wheel handle 68 engages an inside portion of wall member 44, rather than wall member 64, to prevent door 60 from swinging outward.

The door 60 also includes at least one ventilation opening 70 made from a slot 72 that is formed in the heavy gauge steel sheathing. This slot 72 is covered by plate steel 74 offset from the face of the slot, and is attached to the door 60 by being welded or other suitable attachment mechanisms. In this manner, ventilation is provided through opening 70 while ensuring that small missile debris can not enter the safe room 40. The door 60 is constructed to be as strong as the other wall members of the safe room 40.

Figure 5:
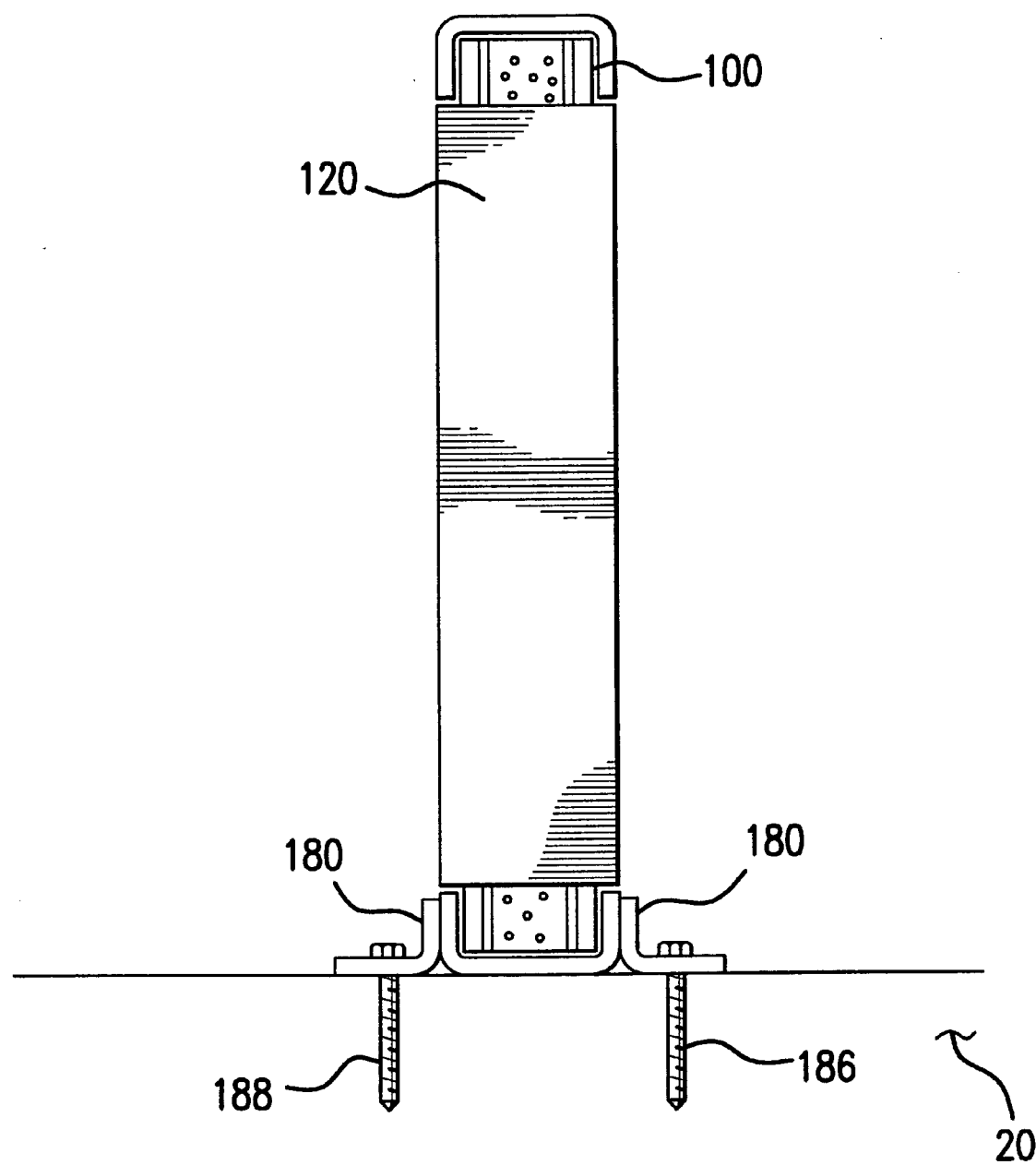
FIG. 5 is a side view of a wall member shown fixedly anchored to a foundation via flanges and anchoring bolts.
Figure 6:
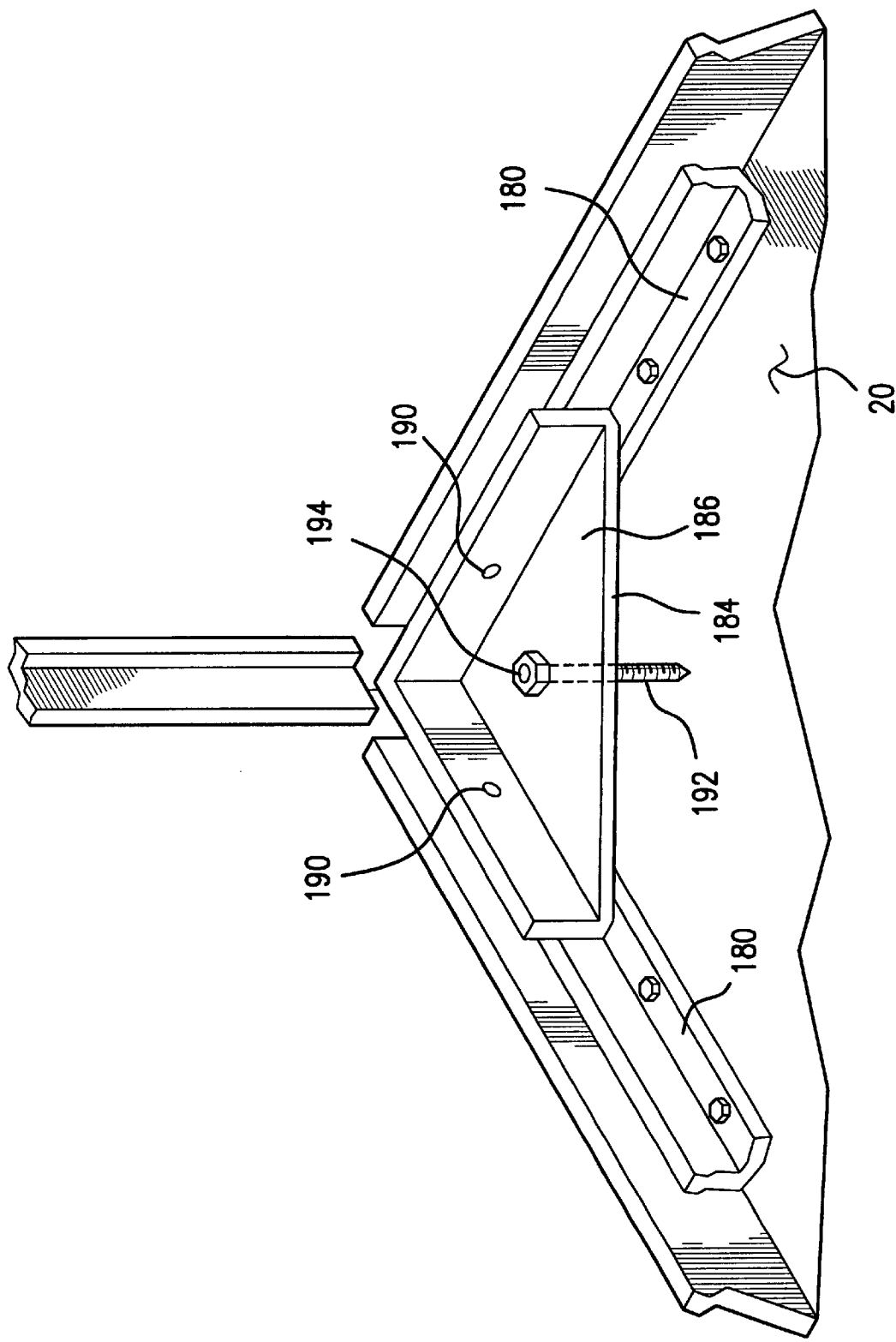
FIG. 6 is a perspective view of the safe room showing an inside corner fixedly mounted to a foundation via a corner bracket and anchoring bolts.

Anchoring the safe room 40 to the foundation 20 is facilitated by the use of flanges 180 and corner brackets 184, as shown in FIGS. 5 and 6. The flanges 180 are fixedly attached to both sides of each wall member along the bottom edge by being screwed, bolted or welded to the associated portion of the wall members' U-shaped channel 120. The flanges, and thus wall members, are anchored to the foundation 20 with anchor bolts 188. Flanges 180 are preferably made of heavy gauge steel.

In conjunction with the flanges 180, comer brackets 184 are used at the inside corners of the safe room 40 to help anchor the safe room 40. Each comer bracket, preferably made of steel, is triangularly shaped and has a "web" portion 186. The corner brackets 184 are fixedly attached to two adjacent wall members and positioned on top of the corresponding flanges 180. Anchorage bolts 192, which pass through a hole 194 formed in the web portion 186 of the corner bracket 184, are then used to fixedly anchor the comer brackets 184, and thus the wall members, to the foundation 20. Preferably, all of the inside comers of the safe room 40 utilize the above described comer bracket 184 anchorage device.

Figure 7:
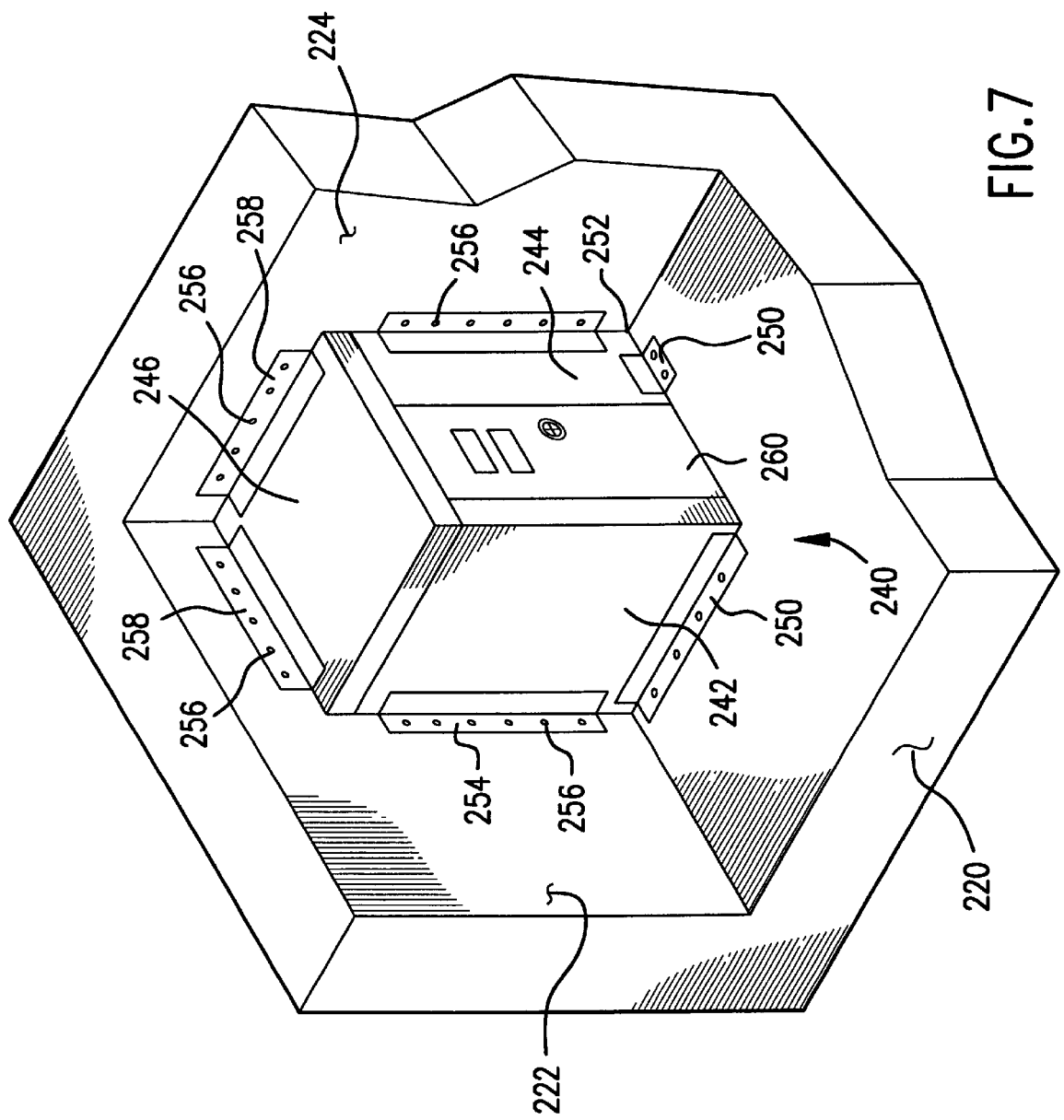
FIG. 7 is a perspective view of a second embodiment of the safe room, where two walls of the safe room are formed from concrete walls of the reinforced foundation of a dwelling.
Figure 9:
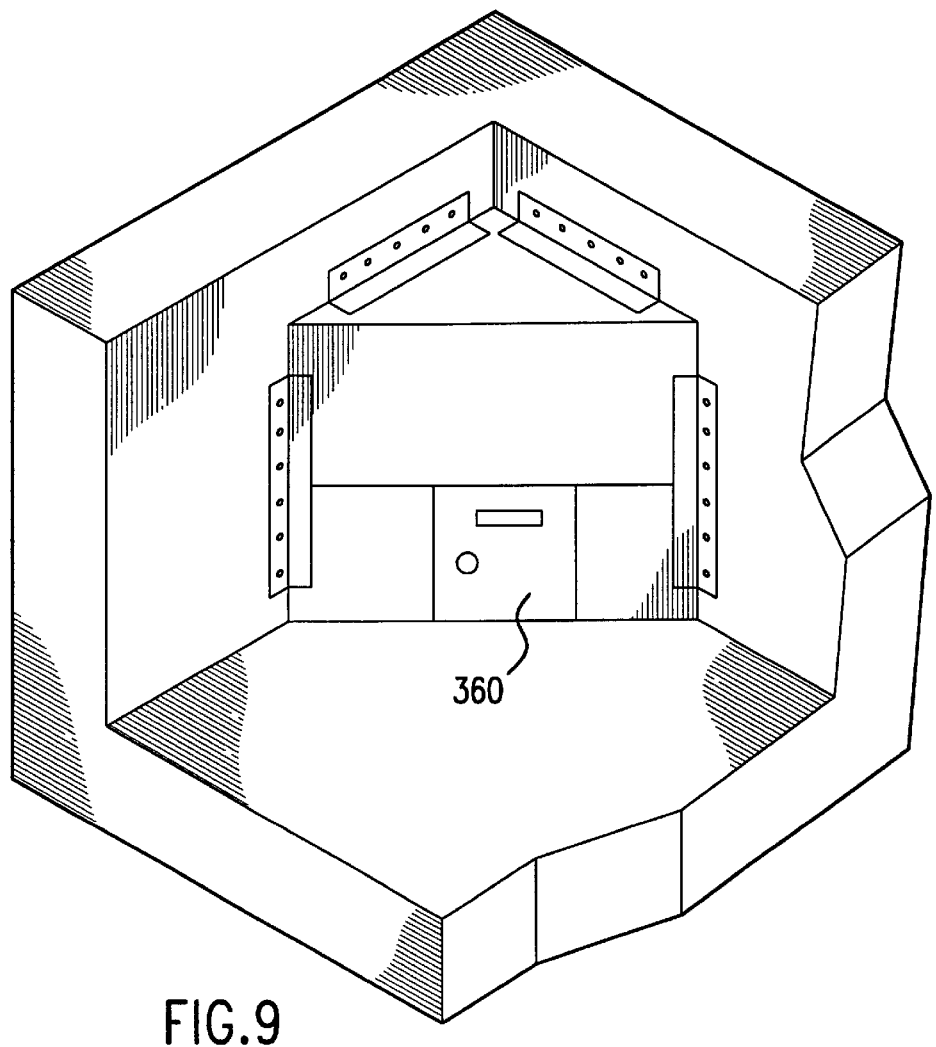
FIG. 9 is a perspective view of a fourth embodiment of a safe room with three walls, where two walls of the safe room are formed from concrete walls of the reinforced foundation of a dwelling.

The foundation 20 material may be concrete, steel, or wood, and must be of suitable thickness (or depth) according to engineering specifications for each particular size safe room. The anchorage of the safe room 40 prevents overturning and uplift of the safe room 40 while the thickened slab acts as a footing beneath the walls for structural support. Although the foundation 20 shown in FIG. 1 is horizontal with respect to the safe room 40, the foundation may also be vertical, such as where the safe room is constructed in the comer of a reinforced concrete basement, as shown in FIGS. 7 and 9 and discussed later.

The components described above in combination form a safe room 40 that will allow the occupants to survive severe natural disasters and windstorms such as tornadoes or hurricanes with little or no injury. Of course, the safe room 40 can also provide protection against other hazards, such as explosions and burglars. The structural strength of the metallic-skinned foamed panels 110 with impact-absorbing cladding 112 attached thereto, combined with the sturdiness of the steel U-shaped channels 120 that connect the wall members and roof member, and the anchorage of the heavy gauge steel flanges 180 and corner brackets 184 to a foundation 20, make for an extremely durable structure against high windloads. The wall members, roof member, and door are capable of resisting penetration by windborne debris which impact the wall members with a force equal to that of a 15 pound 2×4 lumber missile shot at over 100 mph from a tornado cannon. This represents extreme tornado winds of over 250 mile per hour. When such an airborne missile strikes the safe room 40, the impact-absorbing; cladding 112 secured to the foam panels 110 acts as an elastic barrier against missile perforation. The metallic-skinned foam panels 110 also contribute to shock absorption, taking the initial brunt of the impact from a missile. The impact-absorbing cladding then disperses the impact force across several panels to which it is secured, thus preventing perforation by the missile. Although the missile may penetrate enough to cause an indentation in the panel barrier, the impact-absorbing cladding 112 prevents perforation and thus protects the occupants within the structure.

The above safe room 40 is lightweight yet strong enough to withstand killer tornado and hurricane wind loads and missile impact loads. As such, it can be pre-assembled and shipped to the installation site with only the need to be secured to a foundation. Or, the safe room 40 can also be easily assembled at the installation site. In either case, installation of the safe room 40 is easy, inexpensive, and, apart from the foundation and anchorage thereto, require no structural additions.

In the preferred embodiment shown in FIGS. 1-6, all of the walls and roof are constructed from metallic-skinned foam panels 110 having impact-absorbing sheathing 112 attached to at least one side thereto, the entire wall panel 100 being framed by U-shaped channels 120. A safe room 40 with this construction is especially suited for installation in a home that was not initially designed to experience tornado force winds. In such homes or structures, the safe room 40 can be readily installed in either the basement or the ground floor of the dwelling, after the foundation has been reinforced. However, in new homes with basements that have reinforced concrete foundations already constructed, it may only be necessary to use two wall members and a roof member, with one of the wall members having a door. The reinforced concrete walls of the foundation of the dwelling can be used for the remaining two walls of the safe room.

Such a safe room 240 is shown in FIG. 7. Here, wall members 242, 244, and roof member 246 are constructed from metallic-skinned foam panels 110 having impact-absorbing sheathing attached to at least one side thereto, the entire wall panel 100 being framed by U-shaped channels 120, as shown in FIG. 2. The two wall members 242 and 244 are connected to each in the same manner as described for safe room 40 of the first embodiment, i.e., fixedly connecting the U-shaped channels of adjacent wall members. As with the first embodiment, the wall members 242 and 244 are anchored to the reinforced foundation 220 using flanges 250, and a single corner bracket (not shown in FIG. 7) may be used at the inside corner 252. The side edge of wall member 242 is anchored to reinforced concrete wall 222 using flange 254 and fastener members, such as screws of anchor bolts 256 in the same manner that the wall members 242 and 244 are anchored to the reinforced foundation 220. Both the inside and outside edges of the wall members 242 and 244 are anchored to the reinforced foundation 220. The roof member 246 is similarly anchored to the reinforced foundation 220 using flanges 258 and fastener members, such as screws or anchor bolts 256, and both the inside and outside edges of the roof member 246 are preferably anchored.

Although not meant to be limiting, it is preferred the minimum size of safe room 40 be four feet wide, by eight feet deep, by 7 feet in height. There is no maximum size limit. The metallic-skinned foam panels can vary in thickness from 3 to 6 inches. The thickness of a metal impact-absorbing sheathing may vary according to the specific metal used. An exemplar combination that satisfies the FEMA performance criteria is a sheathing made form A500 grade B steel at least 0.0396 inches thick, with the sheathing mounted on the interior side of the metallic-skinned foam panel. Similarly, the thickness of door sheathing may vary according to the particular grade of steel used. An exemplar combination that satisfies the FEMA performance criteria is a door made from A500 grade B steel at least 0.1233 inches thick, with the door sheathing fixedly mounted to a heavy gauge steel tubing frame. The steel tubing is made from 3 inch diameter tubing, having a wall thickness of 0.1233 inches. In a preferred embodiment, the U-shaped channels, are made of steel having a thickness of at least 0.1084 inches; the steel flanges 180 are made from A500 grade B steel at least 0.1084 inches thick; the corner brackets 186 are made from standard grade steel at least 0.1084 inches thick; and the bolts 124, 160 used to attach the wall panel 100 to the U-shaped channels 120 are TEK 5. The anchor bolts 188 are standard.

As with the first embodiment, the wall member 2 4 4 need not be incorporated into the safe room 240. If wall member 244 is not incorporated, the door member 260 becomes the entire wall of the safe room 240. If wall member 244 is used, it preferably butts against reinforced concrete wall 224. Thus, the outwardly swinging door 260 is reversed in orientation with respect to the safe room 40 of the first embodiment. This enables the door 260 to be pivotally attached to wall member 242 using a door hinge (not shown), which is fixedly attached to the U-shaped channel on wall member 242. The wall member 244 may also be positioned adjacent to wall member 242, in which case the door 260 would either be pivotally connected to the U-shaped channel of wall member 244, or pivotally connected to the reinforced concrete wall 224.

Figure 8:
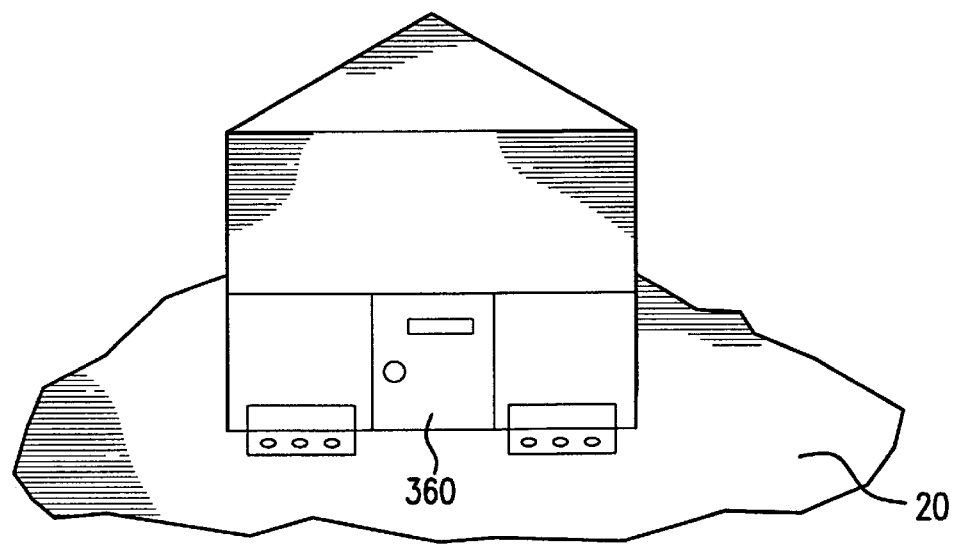
FIG. 8 is a perspective view of a third embodiment of the safe room, where the safe room comprises only three wall members and a roof member.

It is also noted that although the safe rooms 40 and 240 of FIGS. 1 and 7 are shown with four walls, safe rooms with three walls, as shown in FIGS. 8 and 9, may also be constructed. FIG. 8 shows a three sided safe room where all the walls and the roof are made using metallic-skinned foam panels with impact-absorbing sheathing attached to at least on side thereto. FIG. 9 shows a three sided safe room where two walls of the safe: room are reinforced concrete walls of a dwelling, and the third side is a metallic-skinned foam panel with impact-absorbing sheathing wall member. In both cases, the door 360 does not extend to the roof of the safe room, and the associated corner brackets are adapted to fit the three sided structural shape.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components and the grade of steel provided are not meant to be limiting, and the size of the components and grade of steel can vary from that disclosed herein.

What is claimed is:

1. A enclosed structure, comprising:
   at least one wall;
   at least one roof; and
   at least one securable door to the inside of the structure;
   wherein said structure is fixedly anchored to a foundation;
   wherein the at least one wall and the at least one roof each comprise at least one metallic-skinned foam panel with an impact-absorbing sheathing attached to at least one side of the at least one metallic-skinned foam panel as a cladding layer; and
   wherein said impact-absorbing sheathing is fiberglass composite.

2. A enclosed structure, comprising:
   at least one wall;
   at least one roof; and
   at least one securable door to the inside of the structure;
   wherein said structure is fixedly anchored to a foundation;
   wherein the at least one wall and the at least one roof each comprise at least one metallic-skinned foam panel with an impact-absorbing sheathing attached to at least one side of the at least one metallic-skinned foam panel as a cladding layer;
   wherein edges of said walls are fixedly connected to corresponding edges of adjacent walls, and an inside periphery of the roof is fixedly attached to top edges of said walls; and
   wherein said fixedly connected comprises u-shaped channels on adjoining wall members being bolted together.

3. A enclosed structure, comprising:
   at least one wall;
   at least one roof; and
   at least one securable door to the inside of the structure;
   wherein said structure is fixedly anchored to a foundation;
   wherein the at least one wall and the at least one roof each comprise at least one metallic-skinned foam panel with an impact-absorbing sheathing attached to at least one side of the at least one metallic-skinned foam panel as a cladding layer; and
   wherein the structure is fixedly anchored along the edges of the walls to the foundation.

4. An enclosed structure according to claim 3, wherein the structure is fixedly anchored using a plurality of fastener members that engage the foundation, said fastener members engaging a flange that is fixedly attached along an inside and outside periphery of said walls and positioned flush with the bottom edge of said walls.

5. An enclosed structure according to claim 4, wherein the material used to make the flange is heavy gauge steel.

6. An enclosed structure according to claim 4, wherein the structure is fixedly anchored further with a triangularly shaped corner bracket fixedly attached to said wall and positioned on top of said flange, said corner bracket being fastened to said foundation by fastener members.

7. An enclosed structure kit, comprising:
   at least one wall;
   at least one roof; and
   at least one securable door;
   wherein the at least one wall and the at least one roof and the at least one securable door are in an unassembled mode for transportation and are adapted for assembly into an enclosed structure attachable to a foundation;
   wherein the at least one wall and the at least one roof each comprise at least one metallic-skinned foam panel with an impact-absorbing sheathing attached to at least one side of the at least one metallic-skinned foam panel as a cladding layer; and
   wherein said impact-absorbing sheathing is fiberglass composite.

8. An enclosed structure kit, comprising:
   at least one wall;
   at least one roof; and
   at least one securable door;
   wherein the at least one wall and the at least one roof and the at least one securable door are in an unassembled mode for transportation and are adapted for assembly into an enclosed structure attachable to a foundation;
   wherein the at least one wall and the at least one roof each comprise at least one metallic-skinned foam panel with an impact-absorbing sheathing attached to at least one side of the at least one metallic-skinned foam panel as a cladding layer; and
   wherein the wall, roof, and door are adapted to be fixedly anchored along the edges of the walls to the foundation.

9. An enclosed structure kit according to claim 8, wherein the structure is adapted to be fixedly anchored using a plurality of fastener members adapted to engage the foundation, said fastener members adapted to engage a flange that is adapted to be fixedly attached along an inside and outside periphery of said walls and positioned flush with the bottom edge of said walls.

10. An enclosed structure kit according to claim 9, wherein the material used to make the flange is heavy gauge steel.

11. An enclosed structure kit according to claim 9, wherein the structure is adapted to be fixedly anchored further with a triangularly shaped corner bracket adapted to be fixedly attached to said wall and positioned on top of said flange, said corner bracket adapted to be fastened to said foundation by fastener members.

12. An enclosed structure kit, comprising:
   at least one wall;
   at least one roof, and
   at least one securable door;
   wherein the at least one wall and the at least one roof and the at least one securable door are in an unassembled mode for transportation and are adapted for assembly into an enclosed structure attachable to a foundation;
   wherein the at least one wall and the at least one roof each comprise at least one metallic-skinned foam panel with an impact-absorbing sheathing attached to at least one side of the at least one metallic-skinned foam panel as a cladding layer;
   wherein edges of said walls are adapted to be fixedly connected to corresponding edges of adjacent walls, and an inside periphery of the roof is adapted to be fixedly attached to top edges of said walls; and
   wherein said fixedly connected comprises u-shaped channels on adjoining wall members being bolted together.

* * * * *